United States Patent [19]
Kwon

[11] Patent Number: 5,670,755
[45] Date of Patent: Sep. 23, 1997

[54] INFORMATION INPUT APPARATUS HAVING FUNCTIONS OF BOTH TOUCH PANEL AND DIGITIZER, AND DRIVING METHOD THEREOF

[75] Inventor: Ki-duck Kwon, Seongnam, Rep. of Korea

[73] Assignee: Samsung Display Devices Co., Ltd., Kyungki-do, Rep. of Korea

[21] Appl. No.: 420,603

[22] Filed: Apr. 12, 1995

[30] Foreign Application Priority Data

Apr. 21, 1994 [KR] Rep. of Korea ............. 94-8443

[51] Int. Cl.$^6$ ................................ G08C 21/00
[52] U.S. Cl. .................. 178/19; 345/156; 345/173
[58] Field of Search ................. 178/18, 19, 21; 345/173, 174, 156, 179, 182

[56] References Cited

U.S. PATENT DOCUMENTS

| | | | |
|---|---|---|---|
| 4,293,734 | 10/1981 | Pepper, Jr. | 178/18 |
| 4,933,660 | 6/1990 | Wynne, Jr. | 338/114 |

*Primary Examiner*—Curtis Kuntz
*Assistant Examiner*—Paul Loomis
*Attorney, Agent, or Firm*—Leydig, Voit & Mayer

[57] ABSTRACT

An information input apparatus having both functions of touch panel and digitizer is disclosed including a stylus pen for applying a power source and for touching, a panel having upper and lower substrates, a first resistive layer formed on the upper substrate, a second resistive layer formed on the lower substrate, and a spacer for maintaining a predetermined distance and insulation between the first and second resistive layers, and mode selection means for selectively switching between ground and a power source for contact with the second resistive layer, to thereby select an operation mode for operating the panel as a touch panel or digitizer.

8 Claims, 5 Drawing Sheets

INFORMATION INPUT APPARATUS HAVING FUNCTIONS OF BOTH TOUCH PANEL AND DIGITIZER, AND DRIVING METHOD THEREOF

BACKGROUND OF THE INVENTION

The present invention relates to an input system such as a pen computer or personal information terminal, and more particularly, to an information input apparatus and driving method thereof, having functions of both touch panel and digitizer, which is, if necessary, used for a touch panel in which input is made possible with a finger or pen, or for a digitizer in which resolution and precision are superior to the touch panel by using a specially devised stylus pen.

U.S. Pat. No. 4,293,734 discloses a touch panel in which an input function is made possible only by a conductive metal pen. Here, the action of a gloved finger touching the panel is difficult to be recognized.

U.S. Pat. No. 4,933,660, which is devised to overcome such a problem, discloses another touch panel which, when a finger touches the panel, can recognize the action, but does not have the high precision and resolution of a digitizer. This panel has a limit in usage if higher precision and resolution are required.

Meanwhile, a conventional digitizer enables a coordinate recognition only with a specific stylus pen but not with a finger or other pens. This renders use of digitizer inconvenient.

SUMMARY OF THE INVENTION

Therefore, it is an object of the present invention to provide an information input apparatus having both a function of touch panel which enables input with a finger or any pen according to a selection, and a function of digitizer having high resolution and precision by using a specially devised stylus pen.

It is another object of the present invention to provide a method of driving an information input apparatus having both functions of the touch panel and digitizer.

To accomplish the first object of the present invention, there is provided an information input apparatus having both functions of touch panel and digitizer comprising: a stylus pen for applying a power source and for touching; a panel having upper and lower substrates, a first resistive layer formed on the upper substrate, a second resistive layer formed on the lower substrate, and a spacer for maintaining a predetermined distance and insulation between the first and second resistive layers; and mode selection means for selectively switching between ground and a power source for contact with the second resistive layer, to thereby select an operation mode for operating the panel as a touch panel or digitizer.

To accomplish the second object of the present invention, there is provided a method of driving an information input apparatus having both functions of touch panel and digitizer comprising the steps of: selecting a touch mode or digitizer mode by the mode selection means; touching the stylus pen onto the upper substrate, if a digitizer mode is selected in the mode selection; capacitance-coupling at a contact point of the upper substrate and applying the power source to the first resistive layer through the contact point; and amplifying signals of the first resistive layer from either side of the contact point, and comparing the amplified signals to find the location of the contact point; applying a power source of a predetermined voltage to the second resistive layer, if a touch panel mode is selected by the mode selection means; applying pressure to a portion of the upper substrate by using a medium for touching; causing the first resistive layer to touch the second resistive layer by pressure, and applying the signal of the power source from the second resistive layer to the first resistive layer through the contact point; and amplifying signals formed according to the resistance ratio of the two sides of the contact point of the first resistive layer, and comparing the amplified signals to find the location of the contact point.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

To aid the understanding of the present invention, the structure and driving method of the conventional touch panels will be explained prior to the description of the present invention.

Figure 1:
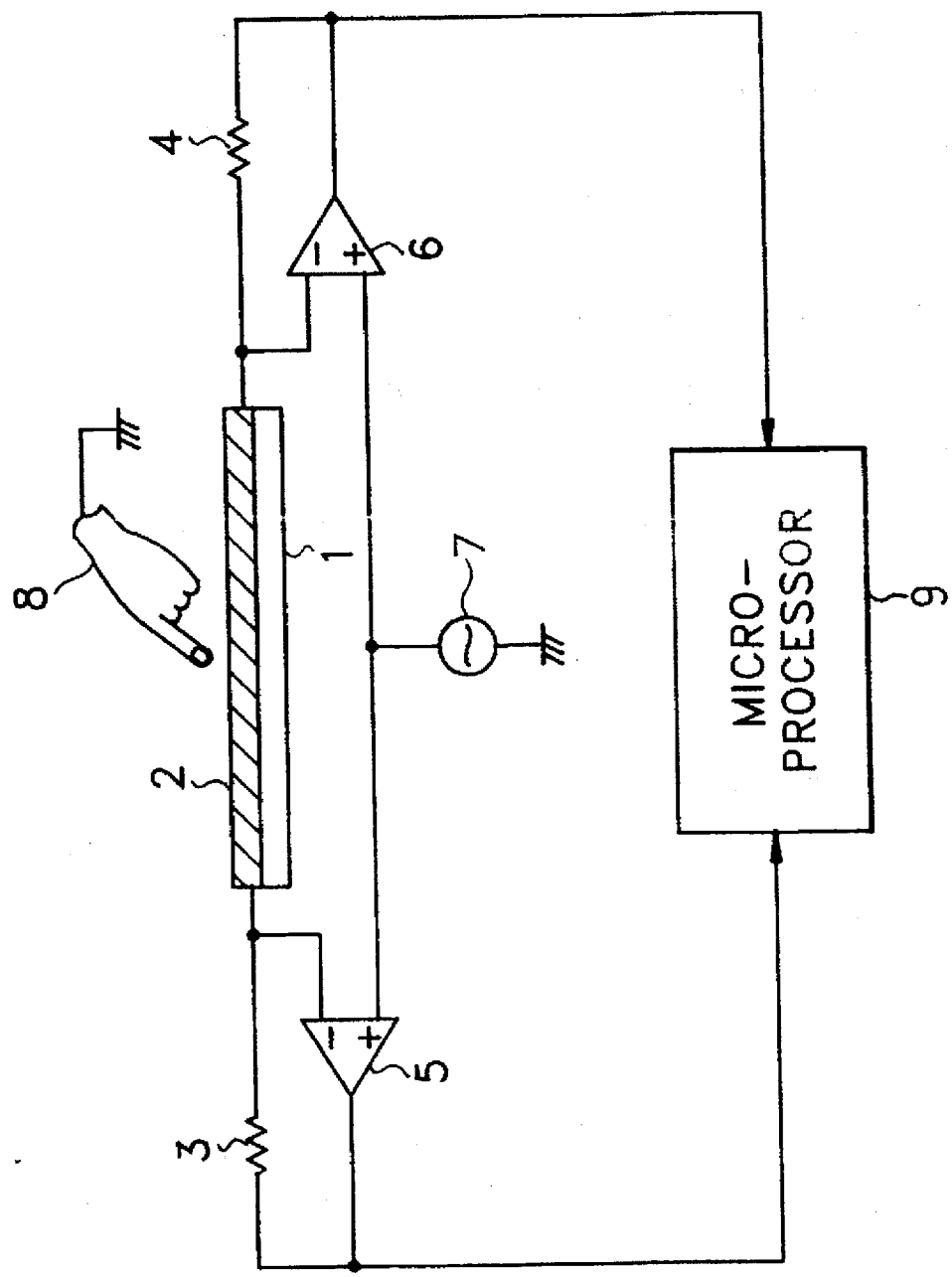
FIG. 1 illustrates the structure and driving method of one example of a conventional touch panel.

FIG. 1 shows the structure and driving method of a conventional touch panel such as that disclosed in U.S. Pat. No. 4,293,734.

In FIG. 1, the touch panel is composed of a glass substrate 1, and an indium-tin-oxide (ITO) resistive layer 2 formed on glass substrate 1 by a predetermined thickness. A driving circuit for driving the touch panel has feedback resistors 3 and 4, respectively connected to one end of ITO resistive layer 2, operation amplifiers 5 and 6 whose inverting ports are connected respectively to one end of feedback resistors 3 and 4, whose non-inverting ports are connected to one end of signal generator 7, and whose output ports are connected to the other ends of feedback resistors 3 and 4, and a signal generator 7 coupled between the non-inverting ports of operation amplifiers 5 and 6 and the ground.

The operation of the above touch panel will be discussed below.

When a contact means 8 (for instance, a grounded finger) touches a portion of ITO resistive layer 2, the resistance ratios of two sides centering on the contact point are varied. As currents or voltages are different in accordance with the resistance ratios, operation amplifiers 5 and 6 including feedback resistors 3 and 4 detect and amplify the different values. The amplified signals of the two sides are compared in microprocessor 9, to find the contact portion. Here, contact means 8 must be grounded. A non-conductive pen or gloved finger makes it difficult to recognize contact.

Figure 2A:
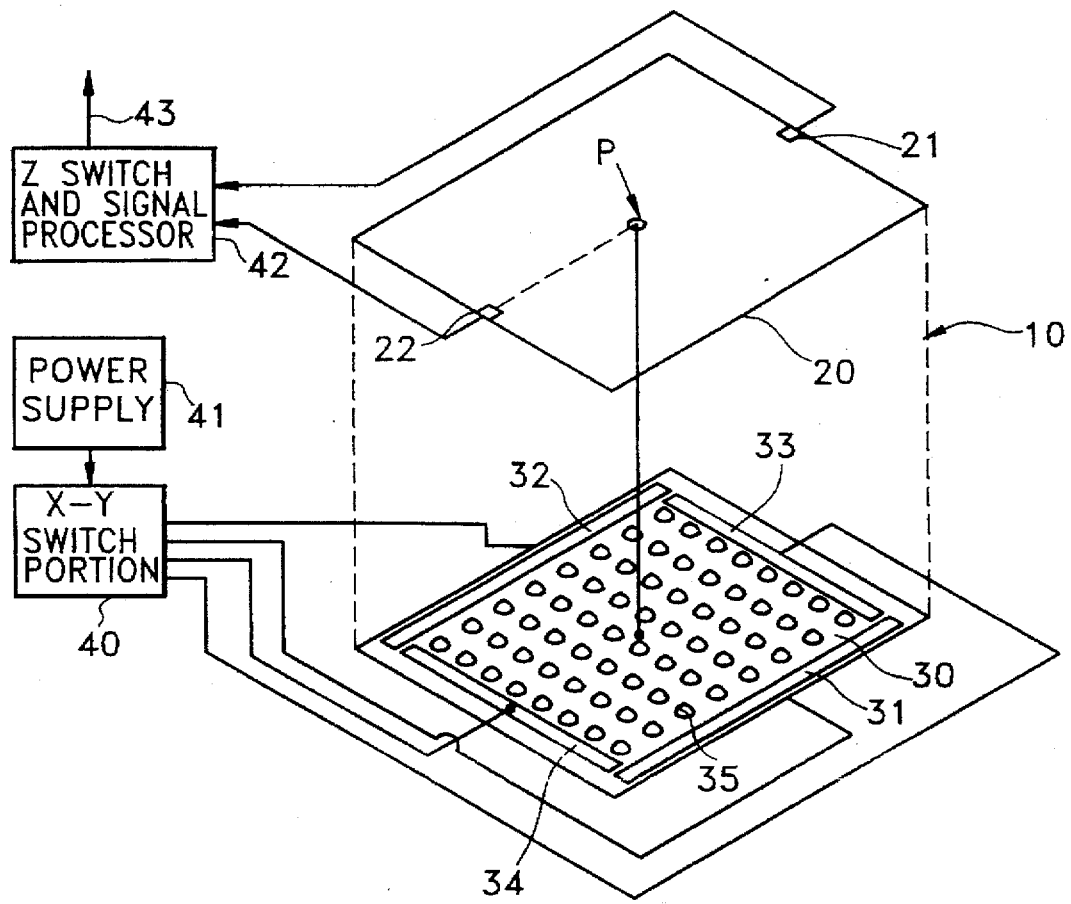
FIGS. 2A and 2B illustrate the structure and driving method of another example of the conventional touch panel.
Figure 2B:
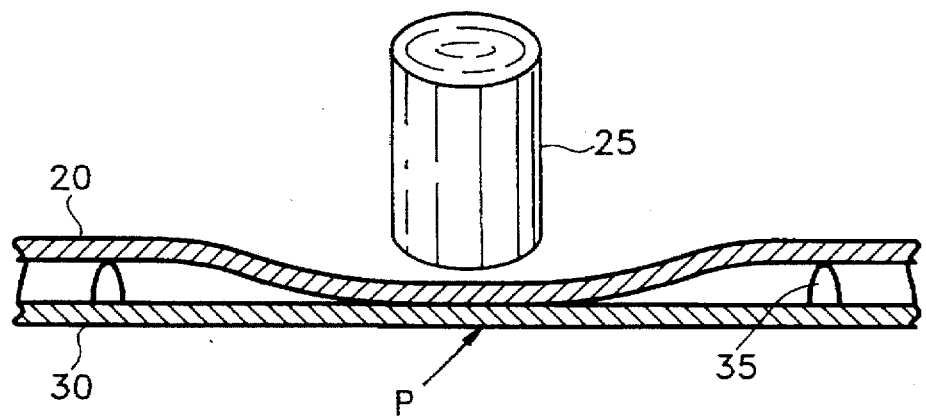

FIGS. 2A and 2B illustrate the structure and driving method of a conventional touch panel disclosed in U.S. Pat. No. 4,933,660.

In FIG. 2A, touch panel 10 is made up of a conductive upper panel layer 20 coated with a conductive material, and a lower panel layer 30 coated with a resistive material. In upper panel layer 20, electrodes 21 and 22 at either end are tied respectively to a Z switch and signal processor 42 to thereby receive a voltage applied from lower panel layer 30. The Z switch and signal processor 42 detect the applied voltage. Lower panel layer 30 has a plurality of insulation spacing points 35 for maintaining a predetermined distance between the upper and lower panel layers and enabling the upper and lower panel layers to come into contact only when the contact means applies a pressure, and X-axis electrodes 31 and 32 and Y-axis electrodes 33 and 34 respectively disposed at either end of the X-Y coordinates. The respective electrodes are coupled to an X-Y switch portion 40.

In the operation of the touch panel, referring to FIG. 2B, when a contact means 25, for instance, a finger, presses contact point P, upper panel layer 20 is compressed around contact point P and thereby comes into contact with lower panel layer 30.

Here, a voltage is alternately applied to either of X-axis electrodes 31 and 32 and to either of Y-axis electrodes 33 and 34 from a power supply 41 according to X-Y switch portion 40. The voltage is applied to upper panel layer 20 via contact point P. Here, different voltages are supplied according to the locations of contact point P. The Z switch and signal processor 42 convert these voltages into signals in accordance with locations on the X-Y coordinates. The converted signals are output through a signal output line 43.

This conventional touch panel of FIGS. 2A and 2B does not restrict contact means. Anything capable of applying pressure qualifies as the contact means. However, in this panel, a signal is transmitted by a physical contact, so that the precision and resolution of a digitizer is difficult to obtain.

Hereinafter, the information input apparatus having both functions of touch panel and digitizer and a method of driving the same of the present invention will be described.

Figure 3:
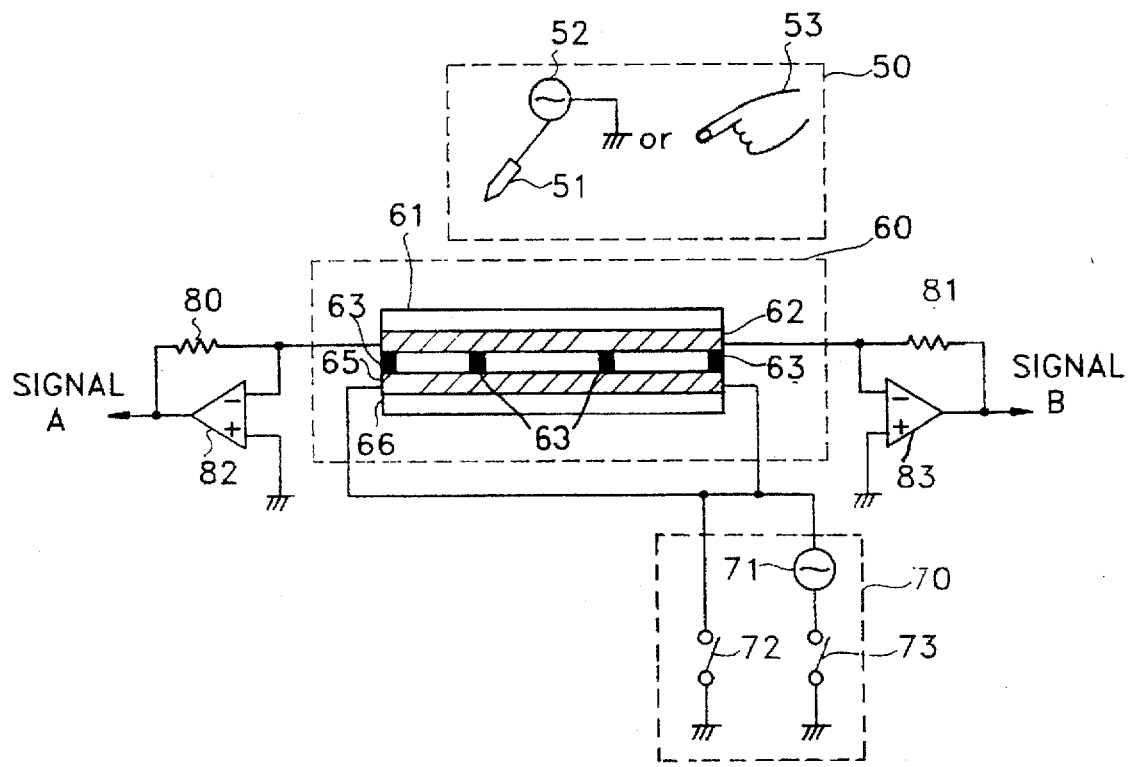
FIG. 3 is a diagram of one embodiment of an information input apparatus having both functions of touch panel and digitizer of the present invention.

Referring to FIG. 3, a panel 60 comprises a film substrate 61, a first ITO resistive layer 62 formed under film substrate 61, a second ITO resistive layer 65 formed under first ITO resistive layer 62, a spacer 63 for maintaining a predetermined distance between first ITO resistive layer 62 and second ITO resistive layer 65, and a glass substrate 66 for fixing the frame of panel 60 under second ITO resistive layer 65.

A driving circuit for panel 60 has contact means 50, feedback resistors 80 and 81, operation amplifiers 82 and 83, and a mode selector 70.

Contact means 50 comprises a power source 52 for generating a signal voltage, a stylus pen 51 connected to power source 52, a finger 53 or another device capable of touching the panel. Mode selector 70 has a switch 72 connected between second ITO resistive layer 65 of panel 60 and the ground, and a power source 71 and switch 73 connected in parallel with switch 72.

Film substrate 61, when brought into contact with contact means 50, functions to capacitance-couple the contact point to stylus pen 51 between stylus pen 51 of contact means 50 and first ITO resistive layer 62 if the present invention is used as a digitizer. If the information input apparatus of the present invention is used as a touch panel, the film substrate acts to transfer the pressure of contact means 50 downward.

The first ITO resistive layer 62 is formed in a lattice structure so as to have a uniform resistance value. If the present invention is used as a digitizer and stylus pen 51 including grounded power source 52 comes into contact with film substrate 61, a capacitance coupling is created between film substrate 61 and first ITO resistive layer 62. If the present invention is used as a touch panel and a portion of film substrate 61 is pressed by contact means 50, the distance between first ITO resistive layer 62 and second ITO resistive layer 65 is narrowed so that they come into contact with each other. Here, contact resistance is formed. By doing so, the two sides of first ITO resistive layer 62, centering on the location of capacitance-coupling or contact resistance, have different resistances. In order to amplify and detect these different values, the ends of first ITO resistive layer 62 are tied to operation amplifiers 82 and 83.

Spacer 63 includes more than one insulator for maintaining a predetermined distance between second ITO resistive layer 65 and first ITO resistive layer 62. If a portion of film substrate 61 is pressed, contact resistance is formed at the area where second ITO resistive layer 65 and first ITO resistive layer 62 are pressed and come into contact with each other. The area not pressed, that is, the portions excluding the pressed area, maintain a predetermined distance because the portions are separated spacer 63.

The second ITO resistive layer 65 is formed to a predetermined thickness on glass substrate 66, and its ends are selectively connected to ground or power source 71 of a predetermined frequency. Glass substrate 66 fixes and supports the frame of the panel.

Mode selector 70 is composed of a switch for selectively connecting power source 71 of a predetermined frequency and the ground to second ITO resistive layer 65.

Figure 4:
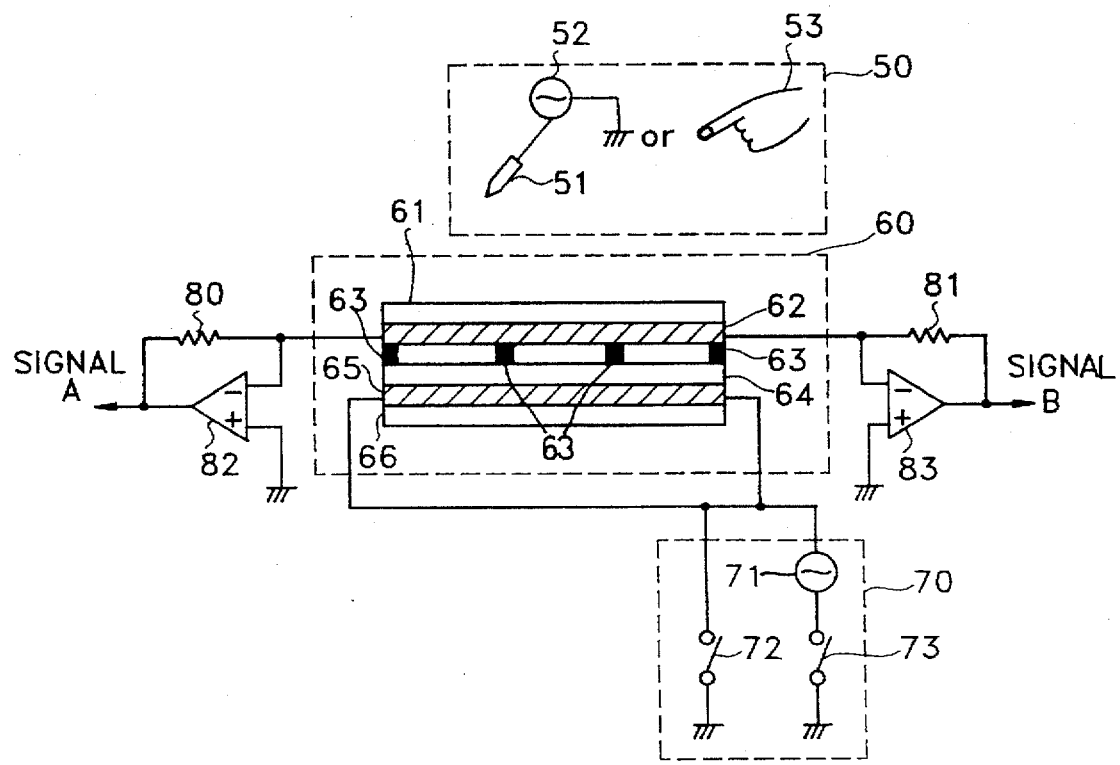
FIG. 4 is a diagram of another embodiment of the information input apparatus having both functions of touch panel and digitizer of the present invention.

In FIG. 4, a dielectric 64 is disposed between spacer 63 and second ITO resistive layer 65 in panel 60 of FIG.3.

In this configuration, dielectric 64 is formed on second ITO resistive layer 65 so that first ITO resistive layer 62 and second ITO resistive layer 65 form a capacitance coupling rather than a contact resistance. Here, spacer 63 is disposed between first ITO resistive layer 62 and dielectric layer 64.

In the configurations of FIGS. 3 and 4, in the case where a display is located under an apparatus of the present invention, the panel of the present invention is made of a transparent material so that the screen of the display can be viewed through the panel.

The operation of the above configurations will be described below.

Figure 5:
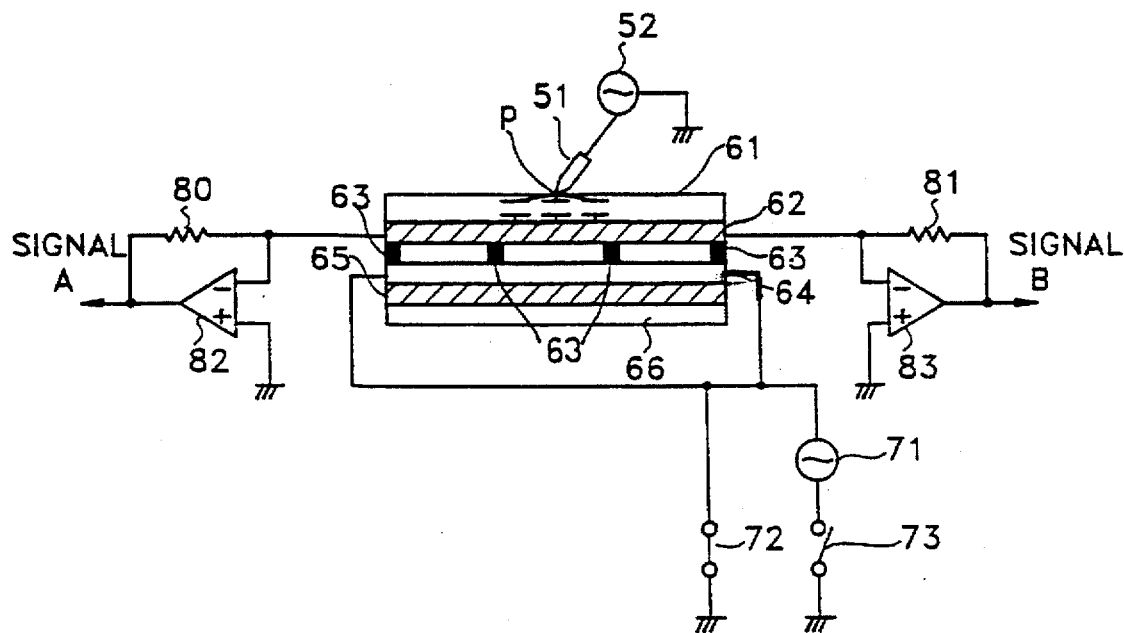
FIG. 5 is a diagram for illustrating a method of driving the digitizer of the information input apparatus having both functions of touch panel and digitizer shown in FIGS. 3 and 4.

FIG. 5 is a diagram for explaining the operation when the operation mode is selected as a digitizer in the touch panel/digitizer system of the present invention shown in FIGS. 3 and 4.

In order to use power source 52 included in stylus pen 51 and select the digitizer mode, switch 73 is turned off to interrupt power source 71 and switch 72 is turned on, to thus ground the second ITO resistive layer 65. If stylus pen 51 including power source 52 comes into contact with a portion of film substrate 61, a capacitance coupling is formed at the contact portion of film substrate 61 and stylus pen 51. Here, power source 52 from stylus pen 51 is connected to first ITO resistive layer 62 through the capacitance-coupling portion. In first ITO resistive layer 62, due to the differences of resistance between the capacity coupling portion of film substrate 61 and the ends thereof, the voltage and current are varied. The different values are amplified by operation amplifiers 82 and 83 including feedback resistors 80 and 81. The amplified signals A and B are compared in a microprocessor (not shown) to recognize the contact point.

When a display (e.g., a liquid crystal display) is located under an apparatus of the present invention, second ITO resistive layer 65 is connected to ground and functions to cancel noise produced from the display. This improves the signal-to-noise ratio.

Figure 6:
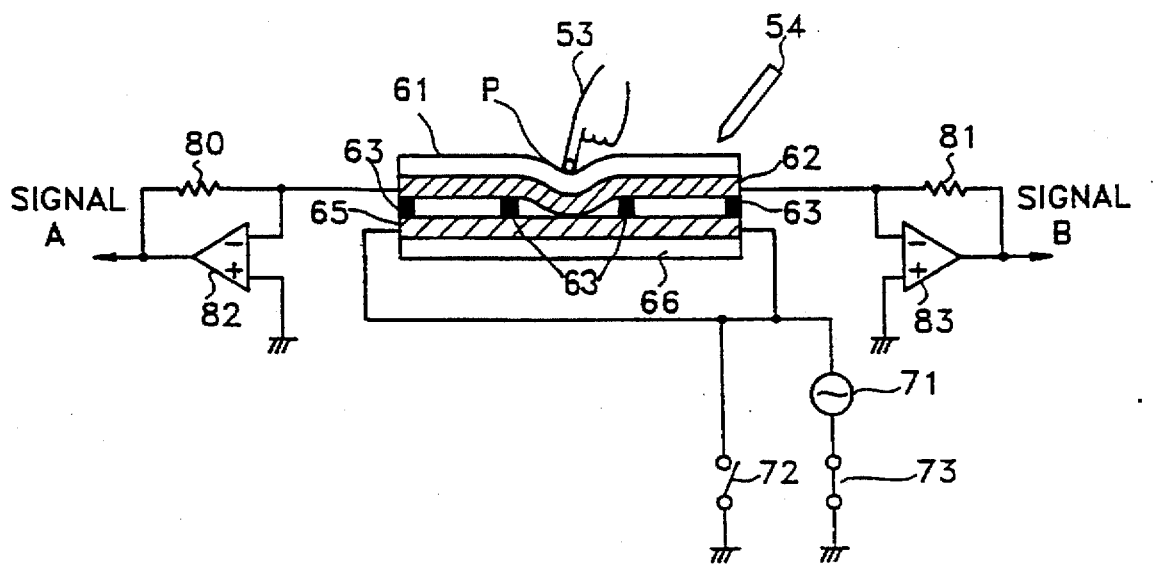
FIG. 6 is a diagram for illustrating a method of driving the touch panel of the information input apparatus having both functions of touch panel and digitizer shown in FIG. 3.

FIG. 6 illustrates the operation when the operation mode is selected as a touch panel in the touch panel/digitizer system of the present invention shown in FIG. 3.

In order to use power source 71 instead of power source 52 of stylus pen 51 and select the touch panel mode, switch 73 is turned on and switch 72 is turned off. Sequentially, a finger, pen or other medium for touching is used to press a portion of film substrate 61. The predetermined distance maintained by spacer 63 is narrowed so that a portion of first ITO resistive layer 62 comes into contact with second ITO resistive layer 65 but other portions thereof maintain their previous distance.

The contact portion forms a contact resistance and thereby has a small resistance value. Other portion has a relatively large resistance value. The voltage applied to second ITO resistive layer 65 is transmitted to first ITO resistive layer 62 through the contact portion. The differences of resistance at the ends of first ITO resistive layer 62 vary the voltage and current. The magnitude of the voltage (or current) is amplified by operation amplifiers 82 and 83 including feedback resistors 80 and 81. The amplified signals A and B are compared in a microprocessor (not shown) to recognize the contact portion.

Figure 7:
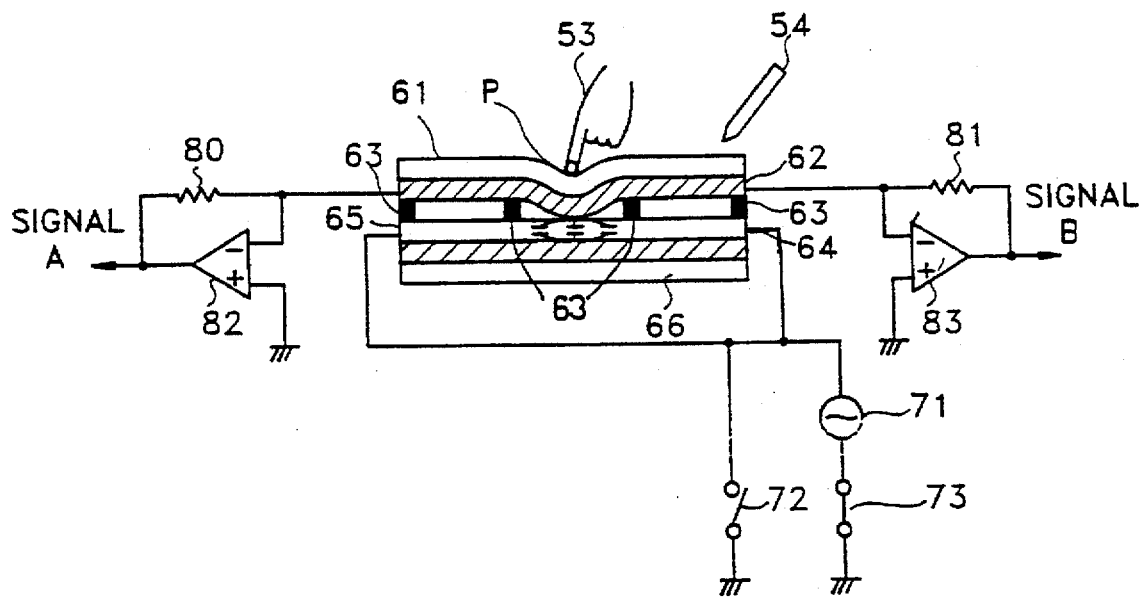
FIG. 7 is a diagram for illustrating a method of driving the touch panel of the information input apparatus having both functions of touch panel and digitizer shown in FIG. 4.

FIG. 7 is a diagram corresponding to a touch-panel operating mode selection, in the touch panel/digitizer system of the present invention shown in FIG. 4.

In order to select the touch panel mode and use power source 71, instead of power source 52 of stylus pen 51 used when the digitizer function is selected, switch 73 is turned on and switch 72 is turned off. Sequentially, a finger, pen or other medium for touching is used to press a portion of film substrate 61. The predetermined distance maintained by spacer 63 is narrowed so that a portion of first ITO resistive layer 62 comes into contact with dielectric 64 but other portion thereof maintains the distance. A capacitance coupling is formed at the contact portion through dielectric 64. Here, the voltage applied to second ITO resistive layer 65 is transmitted to first ITO resistive layer 62 through the capacitance-coupling portion of dielectric 64. Due to the differences of resistance at the ends from the capacitance coupling portion of first ITO resistive layer 62, the voltage and current are varied. The different values are amplified by operation amplifiers 82 and 83 including feedback resistors 80 and 81. The amplified signals A and B are compared in 9 microprocessor (not shown) to recognize the contact point. Here, the capacitance difference between the capacitance coupling portion and non-coupling portion of dielectric 64 is so great that the recognition of the contact portion is enabled.

As described above, in the present invention, the digitizer technology and touch panel technology are integrated to have both high resolution and accuracy like a digitizer and a function of touch panel in which input is enabled with a finger, pen or other medium.

What is claimed is:

1. An information input apparatus having both functions of a touch panel and a digitizer comprising:

a stylus pen for applying a power source and for touching;

a panel having upper and lower substrates, a first resistive layer formed on said upper substrate, a second resistive layer formed on said lower substrate, and a spacer for maintaining a predetermined distance and for providing insulation between said first and second resistive layers; and mode selection means connected to said panel for selectively switching between ground and a power source for contact with said second resistive layer, to thereby select an operation mode for operating said panel as a touch panel or digitizer.

2. An information input apparatus having both functions of touch panel and digitizer as claimed in claim 1, wherein said panel further comprises a dielectric of a predetermined thickness between said second resistive layer and the spacer.

3. A method of driving an information input apparatus having both functions of touch panel and digitizer, the information apparatus including a stylus pen, a panel having upper and lower substrates, a first resistive layer formed on the upper substrate, a second resistive layer formed on the lower substrate, and a spacer formed to maintain a predetermined distance and provide insulation between the first and second resistive layers; and mode selection means for selectively switching between ground and a power source for contact with said second resistive layer, to thereby select an operation mode for operating said panel as a touch panel or digitizer, said method comprising the steps of:

selecting a touch mode or digitizer mode by said mode selection means; and driving the panel as a touch panel or digitizer according to the selected mode.

4. A method of driving an information input apparatus having both functions of touch panel and digitizer as claimed in claim 3, wherein said operating step comprises the steps of:

touching said stylus pen onto said upper substrate, if a digitizer mode is selected in the mode selection;

capacitance-coupling at a contact point of said upper substrate and applying said power source to said first resistive layer through said contact point; and amplifying signals of said first resistive layer from either side of the contact point, and comparing said amplified signals to find the location of the contact point.

5. A method of driving an information input apparatus having both functions of touch panel and digitizer as claimed in claim 3, wherein said operating step comprises the steps of:

applying a power source of a predetermined voltage to said second resistive layer, if a touch panel mode is selected by said mode selection means;

applying pressure to a portion of said upper substrate by using a medium for touching;

causing said first resistive layer to touch said second resistive layer by pressure, and applying the signal of said power source from said second resistive layer to said first resistive layer through the contact point; and amplifying signals formed according to the resistance ratio of the two sides of the contact point of said first resistive layer, and comparing said amplified signals to find the location of the contact point.

6. An information input apparatus as claimed in claim 2 further comprising first and second amplifiers connected to the panel.

7. An information input apparatus as claimed in claim 6 wherein said first and second amplifiers are connected to the first resistive layer.

8. An information input apparatus as claimed in claim 2 wherein said mode selection means is connected to the second resistive layer.

* * * * *